US012645691B2

(12) United States Patent (10) Patent No.: US 12,645,691 B2
Subber et al. (45) Date of Patent: Jun. 2, 2026

(54) UNSUPERVISED VALIDATION FRAMEWORK FOR LARGE LANGUAGE MODEL (LLM) OUTPUTS

(71) Applicant: Honeywell International Inc., Charlotte, NC (US)

(72) Inventors: Waad Subber, Schenectady, NY (US); Ankit Singh, Apex, NC (US); Eric Hartye, Oak Ridge, TN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/938,336

(22) Filed: Nov. 6, 2024

(65) Prior Publication Data

US 2026/0127191 A1 May 7, 2026

(51) Int. Cl.
*G06F 16/25* (2019.01)
(52) U.S. Cl.
CPC ................................. *G06F 16/254* (2019.01)
(58) Field of Classification Search
CPC .............................. G06F 16/254; G06N 20/00
USPC ....................................................... 707/602
See application file for complete search history.

(56) References Cited

U.S. PATENT DOCUMENTS

| | | | | |
|---|---|---|---|---|
| 2021/0089931 A1* | 3/2021 | Bellec | ................ | G06Q 10/0631 |
| 2024/0070543 A1* | 2/2024 | Zander | .................... | G06F 3/015 |
| 2024/0330583 A1* | 10/2024 | Ryan | .................... | G06V 10/764 |
| 2024/0412720 A1* | 12/2024 | Vasylyev | .......... | G06F 16/90332 |
| 2025/0086235 A1* | 3/2025 | Kumar | .............. | G06F 16/90332 |
| 2025/0225152 A1* | 7/2025 | Ryan | ...................... | G06V 10/82 |
| 2025/0259009 A1* | 8/2025 | Mukherjee | .............. | G06F 40/40 |
| 2025/0322244 A1* | 10/2025 | Mysore | ................ | G06N 3/0895 |

* cited by examiner

*Primary Examiner* — Hung T Vy
(74) *Attorney, Agent, or Firm* — Alston & Bird LLP

(57) ABSTRACT

The disclosure relates to a system and method for unsupervised validation of Large Language Model (LLM)-generated outputs. The method includes the steps of receiving input data, which may comprise structured or unstructured text; generating an LLM output based on the input data; extracting a first set of topics from the input data, with each topic represented by a set of keywords; converting the first set of topics into human-readable reference data; extracting a second set of topics from the LLM output; and converting the second set of topics into human-readable candidate data. The method further includes comparing the reference data with the candidate data using one or more performance metrics. Finally, the method determines a validation score based on the comparison results. The disclosed method allows for the objective validation of LLM-generated content, enhancing accuracy and efficiency in diverse applications such as customer service, technical documentation, and legal analysis.

20 Claims, 5 Drawing Sheets

STEP A

JSON

LLM1

Closing letter

STEP B

Topic modelling

LLM2

Topics

Performance metrics

Figure 1

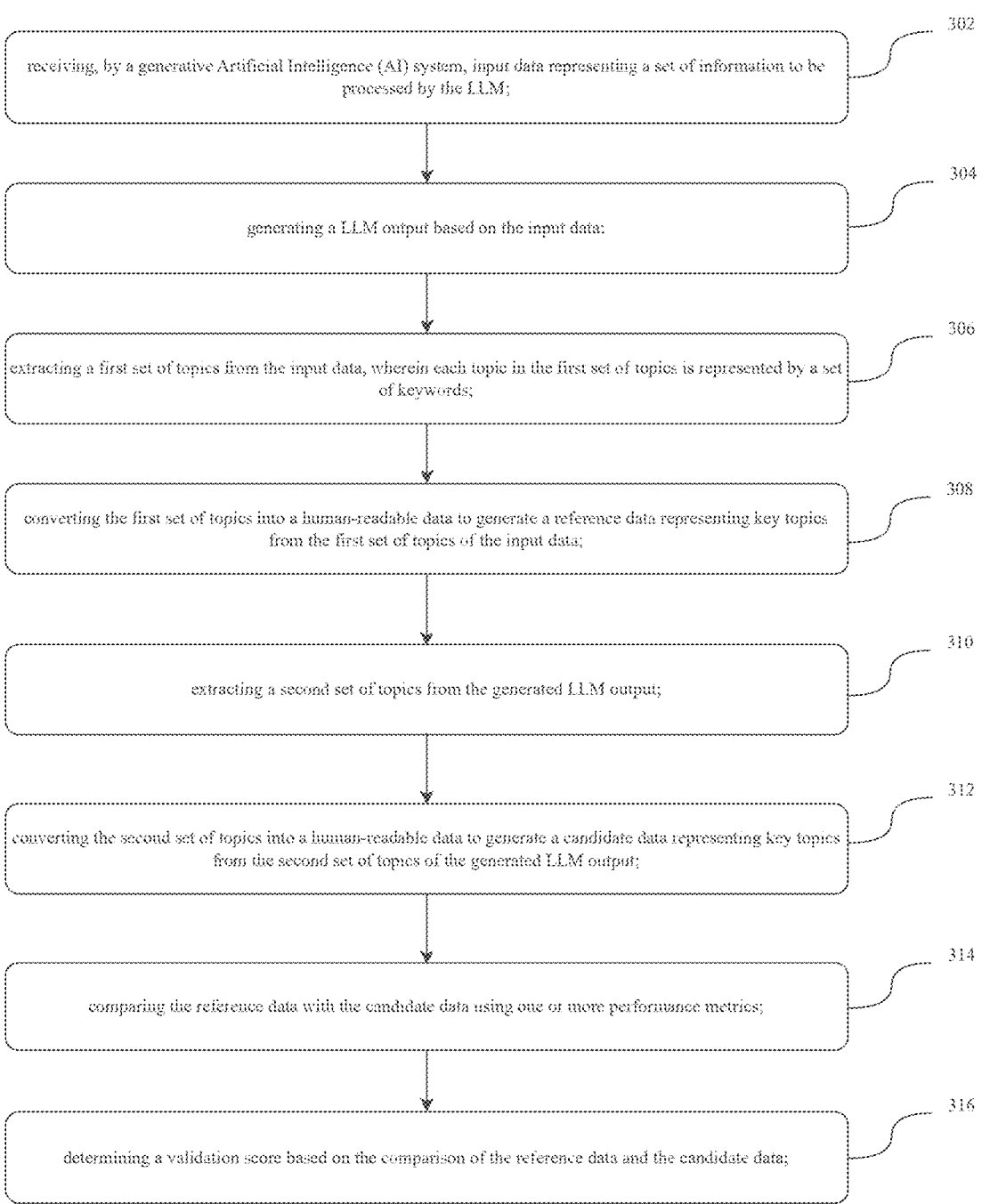

receiving, by a generative Artificial Intelligence (AI) system, input data representing a set of information to be processed by the LLM;                                                                   302 generating a LLM output based on the input data;                                                                   304 extracting a first set of topics from the input data, wherein each topic in the first set of topics is represented by a set of keywords;                                                                   306 converting the first set of topics into a human-readable data to generate a reference data representing key topics from the first set of topics of the input data;                                                                   308 extracting a second set of topics from the generated LLM output;                                                                   310 converting the second set of topics into a human-readable data to generate a candidate data representing key topics from the second set of topics of the generated LLM output;                                                                   312 comparing the reference data with the candidate data using one or more performance metrics;                                                                   314 determining a validation score based on the comparison of the reference data and the candidate data;                                                                   316

Figure 3

402
a receiving module 404
a generating module 406
an extraction module 408
a converting module 410
a comparing module 412
a determining module

400

500

502
Communication Interface

501
Processor

604
Bus

503
Memory

UNSUPERVISED VALIDATION FRAMEWORK FOR LARGE LANGUAGE MODEL (LLM) OUTPUTS

TECHNICAL FIELD

The present disclosure relates to systems and methods for validating the outputs of large language models (LLMs). More specifically, the present disclosure pertains to an unsupervised validation framework that uses topic modeling and performance metrics to evaluate the quality and coherence of LLM-generated content.

BACKGROUND

In recent years, advancements in artificial intelligence (AI) have led to the development of powerful generative models, such as Large Language Models (LLMs). These models leverage machine learning techniques to generate human-like text by analyzing and learning from vast amounts of data. By identifying patterns and relationships within the data, the LLMs can produce coherent and contextually relevant text outputs across a wide range of tasks. Examples of tasks where LLMs have shown remarkable success include document summarization, dialogue generation, content creation, machine translation, and creative writing.

Despite the potential of generative AI models, particularly LLMs, evaluating their performance remains a significant challenge. In traditional machine learning systems, performance evaluation typically involves splitting the dataset into training, validation, and testing sets. The model's performance is assessed using known ground-truth labels, allowing for objective metrics such as accuracy, precision, recall, and F1 scores to be calculated. However, generative models like LLMs pose a unique challenge because their outputs are often subjective and diverse. Unlike classification or regression models, the outputs of generative models are open-ended, meaning there may be no single "correct" response. This inherent variability complicates the task of defining clear-cut evaluation metrics.

Historically, the performance of generative models has been assessed through a combination of automated metrics (e.g., BLEU, ROUGE, or METEOR scores) and human evaluation. Human reviewers assess the relevance, coherence, fluency, and creativity of the generated text in comparison to human-written reference texts. However, these evaluation methods have limitations. Automated metrics, while useful, often fail to capture the nuances of human language, and they can be poor proxies for the true quality of the generated content. Human evaluation, on the other hand, is time-consuming, subjective, and resource-intensive, making it impractical for large-scale or real-time applications.

The issue becomes even more pronounced in scenarios where there is a lack of pre-existing human-generated reference data. In many real-world applications, especially those involving novel tasks or domains, historical records or human annotations are not always available. One such example arises in the context of complaint management systems, where organizations may be required to generate closing letters summarizing customer complaints and the corresponding resolution. In many cases, such closing letters are either non-existent or vary significantly from case to case, which complicates the process of evaluating the quality of the letters generated by LLMs. Furthermore, the reliance on human-generated reference texts or manual evaluation in such scenarios can lead to delays, inconsistencies, and subjective judgments.

To address these challenges, there is a need for more efficient, reliable, and objective methods to evaluate the outputs of LLMs, particularly in the absence of human reference data. The need is particularly acute in scenarios where human resources are limited, or where reference data is unavailable for new or evolving tasks. Additionally, the subjective nature of human evaluation introduces inconsistencies and variability into the assessment process, further emphasizing the need for automated or unsupervised methods of validation.

SUMMARY

The present disclosure seeks to resolve the above-mentioned challenges by introducing a novel unsupervised validation framework for LLM-generated outputs. Unlike traditional validation techniques that rely on the availability of human-generated reference texts, the proposed framework operates independently of such data. By employing topic modeling and performance metrics such as cosine similarity, precision, recall, and F1 score, the framework allows for the evaluation of LLM outputs in a robust and objective manner. This unsupervised approach is particularly well-suited to use cases such as the generation of closing letters in complaint management systems, where reference data may be unavailable or subjective human evaluation is impractical.

The proposed validation framework operates by extracting key topics from the input dataset (e.g., a complaint record) and generating a corresponding human-readable text using a validation LLM. These extracted topics serve as a reference for comparison with the generated output, such as the closing letter. Performance metrics are computed by comparing the topics in the reference text and the generated text, providing a quantifiable and consistent measure of the LLM's output quality.

This method not only addresses the limitations of existing validation methods but also provides a scalable and efficient solution for a wide range of LLM applications. The framework can be generalized to other domains beyond complaint management systems, making it broadly applicable to any text generation task where human reference data is lacking. Furthermore, by automating the validation process and eliminating the need for manual human evaluation, the framework reduces resource consumption, improves consistency, and enables real-time or large-scale validation of LLM-generated outputs.

According to an aspect of the disclosure, a method for unsupervised validation of a Large Language Model (LLM) generated output is disclosed. The method comprises receiving, by a generative Artificial Intelligence (AI) system, input data representing a set of information to be processed by the LLM and generating an LLM output based on the input data. A first set of topics is extracted from the input data, where each topic in the first set of topics is represented by a set of keywords. The method further comprises converting the first set of topics into human-readable data to generate reference data representing key topics from the first set of topics of the input data. Furthermore, the method comprises extracting a second set of topics from the generated LLM output and converting the second set of topics into human-readable data to generate candidate data representing key topics from the second set of topics of the generated LLM output. The reference data is then compared with the candidate data using one or more performance metrics. Lastly, the method comprises determining a validation score based on the comparison of the reference data and the candidate data.

In some embodiments, the one or more performance metrics comprise at least one of cosine similarity metric, precision metric, recall metric, and F1 score metric.

In some embodiments, the extracting step applies a topic modeling algorithm selected from the group consisting of Latent Dirichlet Allocation (LDA) algorithm, Non-negative Matrix Factorization (NMF) algorithm, and Latent Semantic Analysis (LSA) algorithm.

In some embodiments, extracting the first set of topics comprises determining an optimal number of the first set of topics based on computation of a coherence score.

In some embodiments, the method further comprises selecting an LLM from a plurality of LLMs for output generation based on the validation score.

In some embodiments, the method further comprises generating a confidence score based on the validation score, where the confidence score reflects probability of the LLM-generated output meeting a predefined quality standard.

In some embodiments, the input data comprises structured or unstructured text data, and the generated LLM output comprises a summary, a letter, or a report derived from the input data.

In yet another embodiment, a generative Artificial Intelligence (AI) system for unsupervised validation of a large language model (LLM) generated output is disclosed. The system comprises a memory for storing input data representing a set of information to be processed by the LLM and a processor. The processor is configured to receive input data and generate an LLM output based on the input data. The processor is further configured to extract a first set of topics from the input data and convert the first set of topics into human-readable data to generate reference data representing key topics from the first set of topics of the input data, where each topic in the first set of topics is represented by a set of keywords. Further, the processor is configured to extract a second set of topics from the generated LLM output and convert the second set of topics into human-readable data to generate candidate data representing key topics from the second set of topics of the generated LLM output. Additionally, the processor is configured to compare the reference data with the candidate data using one or more performance metrics and determine a validation score based on the comparison of the reference data and the candidate data.

In some embodiments, the one or more performance metrics comprises at least one of cosine similarity metric, precision metric, recall metric, and F1 score metric.

In some embodiments, the system is further configured to apply a topic modeling algorithm selected from the group consisting of Latent Dirichlet Allocation (LDA) algorithm, Non-negative Matrix Factorization (NMF) algorithm, and Latent Semantic Analysis (LSA) algorithm.

In some embodiments, the system is further configured to determine an optimal number of the first set of topics based on computation of a coherence score.

In some embodiments, the system is further configured to select an LLM from a plurality of LLMs for output generation based on the validation score.

In some embodiments, the system is further configured to generate a confidence score based on the validation score, where the confidence score reflects probability of the LLM-generated output meeting a predefined quality standard.

In some embodiments, the input data comprises structured or unstructured text data, and the generated LLM output comprises a summary, a letter, or a report derived from the input data.

In yet another embodiment, a non-transitory computer-readable medium having stored thereon computer-readable instructions is disclosed. The computer-readable instructions when executed by a processor, cause the processor to execute a method for unsupervised validation of a Large Language Model (LLM) generated output. The method comprises receiving, by a generative Artificial Intelligence (AI) system, input data representing a set of information to be processed by the LLM and generating an LLM output based on the input data. The method further comprises extracting a first set of topics from the input data, where each topic in the first set of topics is represented by a set of keywords and converting the first set of topics into human-readable data to generate a reference data representing key topics from the first set of topics of the input data. Furthermore, the method comprises extracting a second set of topics from the generated LLM output and converting the second set of topics into human-readable data to generate candidate data representing key topics from the second set of topics of the generated LLM output. Additionally, the method comprises comparing the reference data with the candidate data using one or more performance metrics and determining a validation score based on the comparison of the reference data and the candidate data.

The disclosed method and system provide an unsupervised mechanism to validate LLM outputs without relying on human-generated reference texts, making it ideal for applications where such reference data is unavailable or difficult to obtain.

The unsupervised nature of the disclosed framework makes it scalable and efficient, as it eliminates the need for manual validation or pre-existing reference data. This is particularly beneficial in tasks where generating human-labeled data is time-consuming, expensive, or impractical.

Additionally, the system's ability to process various types of input data and adapt to domain-specific requirements enhances its versatility. It can be deployed in numerous industries, including customer service, legal, medical, and business reporting, making it a powerful tool for validating LLM-generated content.

By leveraging topic modeling and performance metrics, the framework provides an automated method for evaluating the quality and coherence of LLM outputs. The introduction of confidence scores further allows for real-time monitoring of output quality, reducing the need for human oversight and enabling higher efficiency in content generation tasks.

This summary is provided to describe select concepts in a simplified form that are further described in the detailed description. This summary is not intended to identify key or essential features of the claimed subject matter, nor is it intended to be used as an aid in determining the scope of the claimed subject matter.

BRIEF DESCRIPTION OF DRAWINGS

Embodiments of the subject matter will hereinafter be described in conjunction with the following drawing figures, wherein like numerals denote like elements, and:

FIG. 1 illustrates a flow diagram of the overall framework for unsupervised validation of Large Language Model (LLM)-generated outputs according to an embodiment of the disclosure;

FIG. 3 illustrates a method for validating the output of an LLM using an unsupervised validation framework according to an embodiment of the disclosure;

Figure 2:
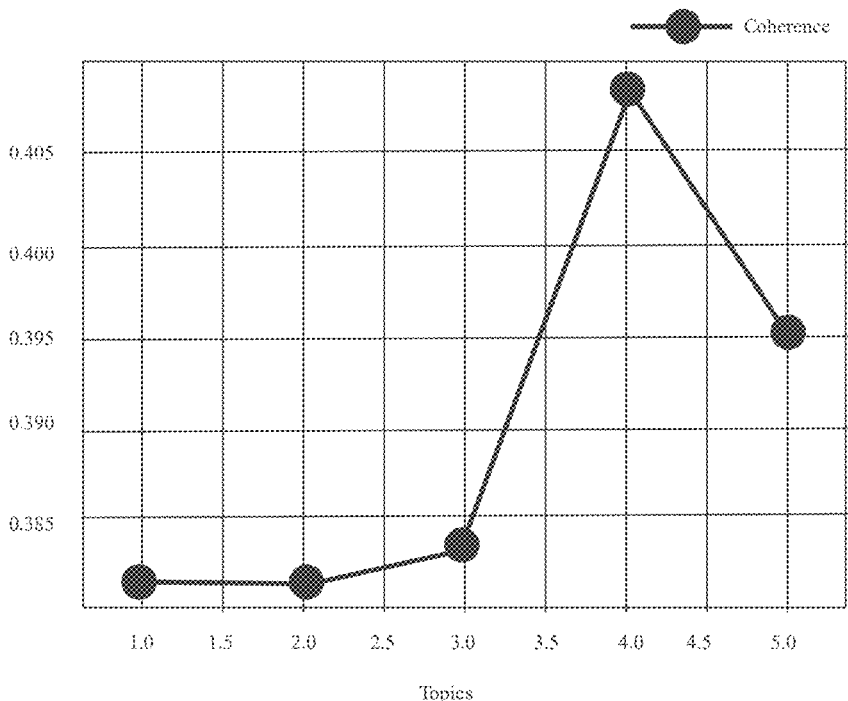
FIG. 2 illustrates a graph representing the relationship between the coherence score and the number of topics for optimizing topic extraction from a given input JSON object according to an embodiment of the disclosure.

Further, skilled artisans will appreciate that elements in the drawings are illustrated for simplicity and may not have necessarily been drawn to scale. For example, the flow charts illustrate the method in terms of the most prominent steps involved to help improve understanding of aspects of the present disclosure. Furthermore, in terms of the construction of the apparatus, one or more components of the apparatus may have been represented in the drawings by conventional symbols, and the drawings may show only those specific details that are pertinent to understanding the embodiments of the present disclosure so as not to obscure the drawings with details that will be readily apparent to those of ordinary skill in the art having the benefit of the description herein.

DETAILED DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

Figure 1:
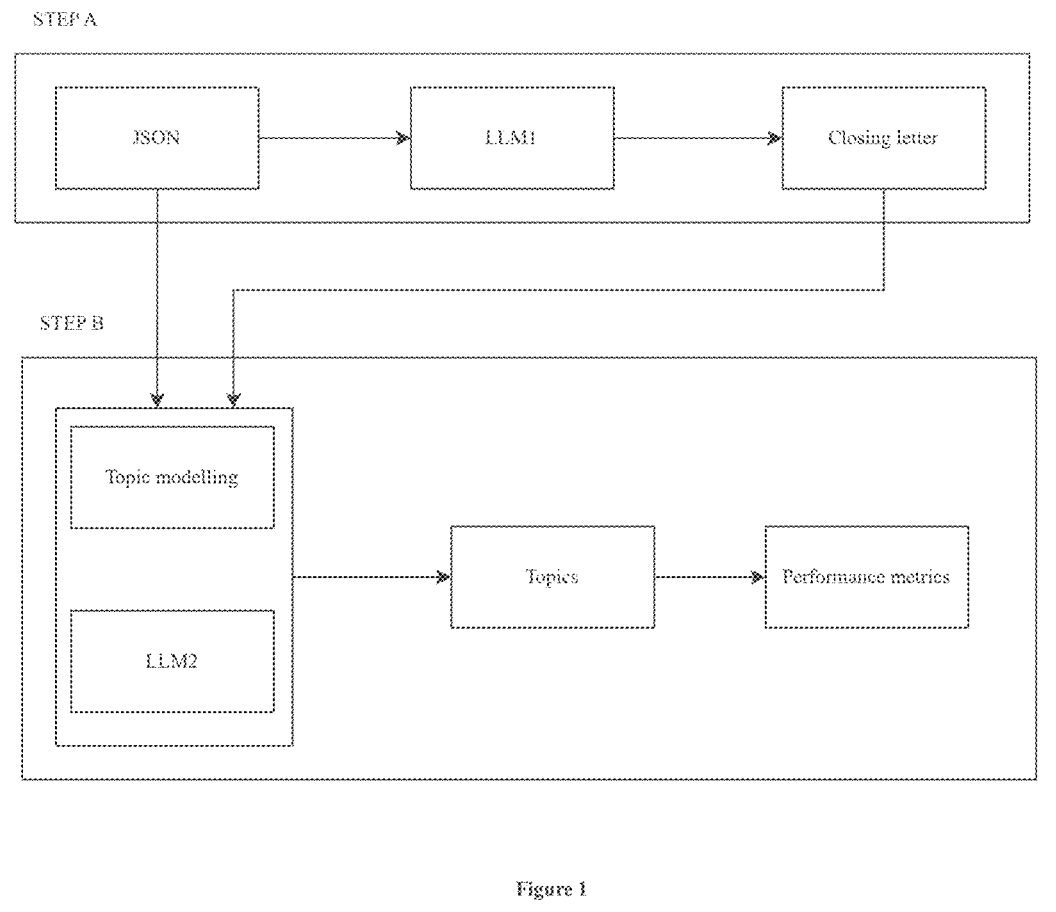

FIG. 1 illustrates a flow diagram of the unsupervised validation framework for Large Language Model (LLM) outputs according to an embodiment of the disclosure. The unsupervised validation framework is designed to assess the quality and coherence of outputs generated by LLMs. This framework leverages a combination of topic modeling, multiple LLMs, and performance metrics to provide an objective evaluation of LLM-generated content, such as closing letters, without the need for human-generated reference data. The diagram delineates two primary stages—step A and step B—each comprising distinct processes essential to the validation framework.

Step A focuses on processing the input data and generating the initial output using the primary LLM (LLM1). The framework begins with input data structured as a JSON object. This data can encompass both structured and unstructured information, such as complaint records, customer feedback logs, emails, technical reports, or legal documents. The versatility in handling various data formats ensures that the framework can be applied across multiple domains and industries.

In an embodiment, the input data processed by the framework can be broadly classified as structured data and unstructured data. Structured data refers to information that is highly organized and formatted in a way that makes it easily searchable and analyzable by machines.

Examples of structured data include complaint records, customer feedback logs, and incident reports. In the complaint records, customer complaints are typically structured into fields such as complaint ID, product or service involved, customer details, issue description, resolution status, and dates. The customer feedback logs include surveys or feedback forms where responses are recorded in predefined categories (e.g., satisfaction scores, issue types, product suggestions).

The incident reports comprise records of incidents or errors related to products or services, organized into fields like description, cause, effect, and actions taken. The LLM1 can easily identify patterns or trends in the structured data due to the clear and well-defined fields. For example, the LLM1 can generate summaries that highlight the root cause of multiple complaints or provide an overview of frequently reported issues.

The unstructured data is information that lacks a specific format, making it more difficult to analyze using traditional data processing techniques. Examples of the unstructured data include emails, technical reports, and legal documents. The emails may include a mix of detailed problem descriptions, product usage feedback, and follow-up questions. The technical reports are documents that contain detailed technical analyses or results, often with various sections describing methodologies, data, outcomes, and conclusions. The legal documents include contracts, agreements, or regulatory submissions that include complex legal language and multiple clauses.

The LLM1 parses unstructured data to extract key points, generate coherent summaries, or simplify complex text. For example, it can condense a long technical report into an executive summary, capturing the essential findings and conclusions. The input data for this framework can be gathered from various sources depending on the domain and the task at hand. Some potential data sources include customer relationship management (CRM) systems, email servers or support ticketing systems.

In the CRM systems, the sources of structured data include complaint records, customer feedback, sales logs, and interaction histories. The framework can be used to generate summary reports from customer interaction data, identifying key issues or satisfaction trends across multiple customers. For email servers or support ticketing systems, sources of unstructured data include email conversations, support tickets, and internal communications related to customer queries or issues.

The LLM1 can generate personalized responses to customer complaints or inquiries based on past email conversations, or it can automatically generate a closing letter that summarizes issue resolution. The framework can process these documents to produce concise summaries, distill important information, or generate executive summaries that highlight key findings.

For legal databases, there are sources of both structured and unstructured data, such as legal filings, contracts, or court decisions. The LLM1 can generate simplified versions of legal contracts or produce summaries of court rulings, allowing legal professionals to quickly grasp the main points without wading through dense legal language.

For incident management systems, the sources of structured data include safety incident logs, quality control reports, or error logs. The system can generate summaries of incident reports or recommend next steps based on the analysis of past incidents and resolutions. The versatility of the framework in handling various types of input data opens multiple embodiments and use cases across different industries and applications.

In an exemplary customer service environment, the JSON objects containing complaint records and customer feedback logs from a customer service system are inputted to the LLM1. The LLM1 generates a closing letter that summarizes the complaint and resolution, ensuring that all relevant details are covered (e.g., description of the issue, actions taken, and outcome). Additionally, after resolving a customer's issue, a business can automatically generate a follow-up closing letter, personalized with the customer's details and issue resolution, and send it to the customer.

In an exemplary embodiment related to legal cases, the input to the LLM1 is legal contracts or filings retrieved from a corporate legal database. The LLM1 processes the legal text to generate a contract summary or a compliance report, highlighting key clauses and obligations while omitting unnecessary legal jargon. In a law firm, legal practitioners can quickly generate summaries of lengthy contracts, enabling them to review agreements more efficiently or prepare compliance documentation.

In an exemplary embodiment pertaining to technical reporting, the input may be technical reports or research papers in PDF or text format. The LLM1 processes the report to generate a concise executive summary, extracting key findings, results, and recommendations.

An engineering team can use the framework to quickly review technical reports and focus on critical outcomes without having to manually sift through detailed analysis. In an exemplary embodiment of incident management, the input is incident logs from an incident management system (structured data). The LLM1 generates a summary report of incidents, categorizing the most common causes and summarizing actions taken to resolve the issues. A quality assurance team can use the framework to generate quarterly summaries of reported incidents, helping identify patterns that may lead to future improvements in safety protocols.

In an exemplary healthcare embodiment, the input may be patient records, treatment logs, or medical history (structured/unstructured data). The LLM1 generates a medical summary for healthcare providers, summarizing the patient's condition, treatments, and recommendations for follow-up. In a healthcare setting, the system can help doctors by automatically generating discharge summaries or treatment plans based on patient history.

In an exemplary educational research environment, the input includes academic papers, research studies, or dissertations (unstructured data). The LLM1 generates a research summary, distilling the key findings, methodologies, and conclusions. In academia, researchers can quickly review literature in their field by using the framework to generate summaries of research papers, enabling them to stay updated without reading full-length studies.

Once the input data is structured as a JSON object, it is fed into the LLM1. Depending on the nature of the data, the LLM1 processes the information as discussed below. In topic identification, the LLM1 scans the input data to identify important topics, keywords, or themes that form the basis of the output.

The LLM1 uses its training to understand the context of the input data, including any nuances or implicit meanings. For instance, in technical reports, the LLM1 can discern between different sections like methodology, results, and conclusions. Based on the identified topics and contextual understanding, the LLM1 generates a well-structured text output. This output, such as a closing letter, executive summary, or contract overview, maintains coherence and relevance to the input data.

The LLM1 tailors the generated output based on the needs of the specific use case. For example, in customer service, the output might include personalized details like the customer's name, the product they complained about, and the resolution offered. The flexible nature of the input data handled by the framework allows it to be applied across multiple industries and domains. By processing both structured and unstructured data from various sources, the LLM1 can generate outputs that are contextually accurate, coherent, and tailored to specific use cases, making the framework a versatile and scalable solution for automating content generation and validation.

In an embodiment, the JSON input is fed into the LLM1, a Large Language Model tasked with generating an output, typically in the form of a closing letter or a similar summary document. The closing letter is intended to encapsulate the main ideas and pertinent details from the input data, providing a coherent and contextually accurate summary.

The LLM1 utilizes its training on vast datasets to produce text that is not only grammatically correct but also contextually relevant to the input data. By automating the generation of closing letters, LLM1 reduces the need for manual drafting, thereby increasing efficiency and consistency in document creation. The output from LLM1, referred to as the closing letter, serves as the initial generated content that will undergo subsequent validation to ensure its quality and relevance to the original input data.

In an embodiment, the LLM1 is trained on vast, domain-specific datasets that include structured and unstructured text from various industries, such as legal, customer service, healthcare, and technical domains. This training allows LLM1 to understand context, identify relevant themes, and generate grammatically correct, coherent text.

In an embodiment, upon receiving the JSON input, the LLM1 processes the data through several stages including contextual understanding, text generation, and summarization. In the contextual understanding, the LLM1 parses the input data to identify key information, such as the nature of a customer complaint, the action taken, and the resolution. It detects the context in which the data is situated, such as whether the complaint pertains to a product defect, service delay, or quality issue. For text generation, based on the parsed information, the LLM1 generates a closing letter that encapsulates the key points. For example, if the input JSON includes a complaint about product discoloration, the closing letter may state: "We have investigated your concern regarding the discoloration of the product and have taken immediate steps to ensure the quality and safety of the batch. We appreciate your patience and have initiated a product replacement."

Finally, in summarization, the system condenses complex, multi-paragraph complaint records into concise, readable summaries. If the input JSON contains multiple sub-issues (e.g., customer service delay, product defect), the LLM1 generates a summary that addresses each aspect in a coherent flow, ensuring clarity and completeness.

In an exemplary customer service case, a company managing high volumes of customer complaints uses the LLM1 to automatically generate closing letters summarizing the nature of complaints and their resolution. This reduces the need for human agents to manually draft each letter. The JSON input may include information such as complaint type (product defect), customer details (name, order ID, product details), resolution (product replacement or refund offered).

The LLM1 processes this structured data to generate a formal response: "Dear Customer, we apologize for the inconvenience caused by the defect in your product. As per your request, we have initiated the replacement of the item, which should arrive within 5-7 business days. Should you have any further concerns, please do not hesitate to contact us."

In an embodiment pertaining to incident reports, in industries such as healthcare or manufacturing, incident reports related to safety issues or product failures are commonly logged in structured formats. The LLM1 can process these reports to generate incident summaries or compliance reports. The JSON input might include fields such as incident description (equipment malfunction), date and time (when the incident occurred), action taken (maintenance performed, safety checks conducted).

Consequently, the LLM1 produces an incident summary: "On Jan. 10, 2023, we encountered a malfunction with the equipment in the production line. Immediate maintenance was performed, and the issue has been resolved. We have also conducted a safety check to ensure no future malfunctions occur."

Step B encompasses the generation of reference data and the subsequent validation of the LLM-generated output. The input JSON data undergoes topic modeling using algorithms such as Latent Dirichlet Allocation (LDA), Non-negative Matrix Factorization (NMF), or Latent Semantic Analysis (LSA). The objective is to extract key topics and associated keywords from the input data.

Topic modeling enables the extraction of key topics and associated keywords from the input data, such as JSON objects. The primary purpose of topic modeling is to identify patterns and relationships between words in large datasets, enabling the system to distill core themes from unstructured or structured data. This technique is particularly useful when validating outputs from a Large Language Model (LLM), as it helps to organize and condense complex information into easily interpretable clusters.

Topic modeling is typically carried out using unsupervised learning algorithms that analyze the distribution of words and their co-occurrence patterns within a dataset. The process aims to discover latent structures in the text and organize it into a set of topics, where each topic represents a collection of words that frequently appear together. The most common algorithms used for this task are Latent Dirichlet Allocation (LDA), Non-negative Matrix Factorization (NMF), and Latent Semantic Analysis (LSA). Each of these algorithms follows similar fundamental steps, though they may differ in terms of mathematical approach.

Topic modeling includes the following steps: preprocessing the input data, document-term matrix (DTM) creation, applying topic modeling algorithms, topic extraction, topic representation, and keyword extraction for validation.

Preprocessing of the input data includes tokenization, removing stop words, and stemming or lemmatization. In tokenization, the first step involves breaking down the input text (e.g., JSON object fields) into smaller units or tokens, typically words or phrases. In the step removing stop words, commonly used but irrelevant words (e.g., "and," "the," "is") are filtered out to ensure the focus remains on meaningful words that contribute to the topics. In stemming or lemmatization, words are reduced to their base or root form. For instance, "running," "ran," and "runs" would all be reduced to "run." This helps in grouping similar words under the same topic.

In the further step of topic modelling, i.e., DTM creation, a document-term matrix is created, where each row represents a document (e.g., the input JSON object), and each column corresponds to a unique word from the dataset. The matrix contains values that represent the frequency of each word in each document. For example, if the input is a complaint record, the matrix might indicate how many times words like "product," "defect," or "replacement" appear in the document.

The step applying topic modeling algorithms includes Latent Dirichlet Allocation (LDA), Non-negative Matrix Factorization (NMF), and Latent Semantic Analysis (LSA). LDA is a generative probabilistic model that assigns a distribution of topics across documents and a distribution of words across topics. The algorithm assumes that each document is a mixture of topics, and each topic is a mixture of words. It uses a probabilistic framework to infer which words are likely to belong to which topics based on their frequency and co-occurrence.

NMF factorizes the document-term matrix into two non-negative matrices, one representing the relationship between documents and topics, and the other representing the relationship between topics and words. This approach is computationally efficient and is often preferred when the data has high dimensionality.

Further, LSA uses Singular Value Decomposition (SVD) to reduce the dimensionality of the document-term matrix, identifying patterns in the relationships between terms and documents. It focuses on finding the most important features (words) that capture the underlying structure of the text.

In the step of topic extraction, after applying the topic modeling algorithm, each document (or JSON object) is represented as a distribution of topics, and each topic is represented as a distribution of words. For example, one topic might include words like "product," "defect," "complaint," and "quality," suggesting that the topic is related to product quality issues.

The coherence score is calculated at this stage to evaluate the interpretability of the generated topics. A high coherence score indicates that the words within a topic make sense together and are likely to reflect meaningful concepts in the input data.

In topic representation, the framework generates a human-readable representation of the topics extracted from the input data. For example, a topic related to product defects might be summarized as "Customer complaints regarding product defects and safety issues." This representation forms the basis for generating reference text via LLM2 and later comparing it to the output generated by LLM1.

In the step of keyword extraction for validation, each topic is associated with a set of keywords that best represent the theme of the topic. These keywords are used as input for LLM2, the validation language model, which will generate reference text to validate the LLM1-generated output.

For instance, in the above-discussed example of a customer complaint about product discoloration, keywords such as "product," "discoloration," "quality," and "replacement" might form the basis of a topic. These keywords are critical for validating the LLM1 output by comparing how well the generated closing letter aligns with the extracted topics.

The topic modeling process simplifies and organizes large datasets to make them interpretable for both machines and humans. In the context of the validation framework, topic modeling helps in two primary ways, distillation of key information and validation of LLM output.

In the distillation of key information, it extracts the most important themes from the input data, allowing LLM1 to focus on generating relevant and coherent outputs. The validation of LLM output includes identifying the key topics present in both the input data and the generated closing letter, the system can use performance metrics to objectively validate the LLM's accuracy and relevance, ensuring that the output is aligned with the original data.

In an alternate embodiment, dynamic topic adjustment can be used. The framework can adjust the number of topics dynamically based on the complexity of the input data. For instance, longer, more detailed complaint records might yield more topics, while shorter complaints could be summarized with fewer topics.

In an embodiment, domain-specific topic modeling can also be used. The topic modeling algorithm can be fine-tuned for specific domains, such as healthcare, legal, or technical documentation. In such embodiments, domain-specific stop words or terminology can be predefined to improve the quality and relevance of topic extraction.

The following shows an output of the topic modelling for a topic:

[0.017*"date"+0.017*"investigation"+0.017*"batch"+ 0.014*"jane"+0.013*"medicorin"+0.013*"customer"+ 0.012*"tablets"+0.011*"discoloration"+0.010*"complaint"+0.009*"last"+0.009*"quality"+0.008*"product"+ 0.008*"process"    +0.008*"immediate"+0.008*"safety"+ 0.008*"assurance"+0.007*"initiated"+ 0.007*"medication"+0.007*"issue"+0.007*"team"]

Topic modeling reduces the complexity of the input data by identifying the most significant themes and concepts. By extracting core topics, the system ensures that only the most relevant information is considered in the validation process. The extracted topics from the input JSON are passed to a second Large Language Model (LLM2), interchangeably designated as the validation LLM in the following description. The LLM2 generates a reference text that provides a human-readable summary of the identified topics.

The following shows the corresponding output of the LLM2 (validation LLM): "Investigating a customer complaint regarding discoloration of Medicorin tablets, with immediate assurance of product safety and quality."

The human-readable summary generated by LLM2 helps in transforming the extracted topics into coherent, understandable text. The goal of this summary is to articulate the key themes and concepts from the input data in a way that can be easily interpreted by both humans and automated systems, ensuring that the content remains contextually accurate and comprehensive.

The LLM2 leverages its extensive training on large datasets to produce text that is clear, fluent, and relevant to the identified topics. Unlike raw data or keyword lists, which may be difficult to interpret in isolation, the LLM2 generates summaries that encapsulate the essence of the extracted topics, offering a concise and well-organized narrative. This process helps bridge the gap between complex, data-driven topic models and the need for clear, actionable insights.

The LLM2 takes the list of topics and associated keywords produced by the topic modeling process and organizes them into a coherent summary. It uses its contextual understanding, developed through training on vast datasets, to ensure that the summary flows naturally and logically.

One of the main purposes of LLM2 is to ensure that the generated summary is coherent and relevant to the input data. The summary must accurately reflect the topics without deviating from the original meaning. LLM2 achieves this by connecting the extracted topics into a well-structured narrative, presenting the information in a way that can be easily understood by human readers or used as a basis for comparison in the validation process.

In an embodiment, the LLM2 is trained to produce natural-sounding language, avoiding awkward or disjointed phrasing that could result from a purely automated process. It transforms raw keywords into fluid sentences, mimicking the language used by human writers in reports, summaries, or formal documents. For example, instead of simply listing keywords such as "product," "complaint," "replacement," and "customer satisfaction," LLM2 generates a summary like: "The customer expressed dissatisfaction with the product due to a defect. A replacement has been issued, and customer satisfaction is being closely monitored to ensure the issue is resolved."

Depending on the domain of application, the LLM2 can adjust the tone and formality of the summary. For instance, in a legal context, the language may be more formal and precise, while in customer service, the tone may be more empathetic and customer-centric. This ensures that the human-readable summary aligns with industry-specific standards and expectations.

An example of legal domain is "The contractual dispute concerns the interpretation of clause 7.3 regarding intellectual property rights. Further review has been scheduled to assess the validity of the client's claims in light of recent amendments to the contract."

Further, the reference text serves as an objective baseline for validating the quality of the output generated by the LLM1. By using the LLM2 to generate reference texts based on the same topics as the LLM1, the framework ensures consistency in the validation process.

Concurrently, the closing letter produced by LLM1 is subjected to the same topic modeling process to extract candidate topics. This step ensures that the key ideas present in the generated output are identified and prepared for comparison.

The following illustrates the output, i.e., candidate data, of the LLM2 (validation LLM) of the generated keywords from the closing letter:

"Investigating a customer complaint regarding discoloration of Medicorin tablets, with Jane's team initiating an immediate assurance of safety and quality of the product and process."

The reference text (from LLM2) and the candidate text (from the closing letter) are compared using a set of performance metrics. These metrics include cosine similarity, precision, recall, and F1 Score. Cosine similarity measures the textual similarity between the reference and candidate texts by calculating the cosine of the angle between their vector representations. The precision assesses the proportion of correctly identified topics in the candidate text relative to the total topics identified in the closing letter. Recall evaluates the proportion of relevant topics from the reference text that are successfully captured in the candidate text. The F1 score provides a harmonic mean of precision and recall, offering a balanced measure of the candidate text's accuracy and completeness.

These metrics offer an objective, numerical evaluation of the LLM-generated output, ensuring that the validation process is free from subjective human bias. The use of automated metrics facilitates scalability, allowing the framework to handle large volumes of data efficiently.

In an alternate embodiment, the closing letter produced by LLM1 can be directly compared with the reference text generated by LLM2, without the need to subject the closing letter to a separate topic modeling process. In this embodiment, the system bypasses the additional step of extracting candidate topics from the LLM1-generated output and instead focuses on a direct, holistic comparison between the entire LLM1 output (closing letter) and the reference text.

This embodiment takes advantage of LLM1's ability to produce a closing letter that already incorporates the most relevant information derived from the input data. As LLM1 has been trained to generate coherent and contextually accurate summaries, the system assumes that the key topics are implicitly reflected in the structure and content of the closing letter. Thus, rather than performing a separate topic extraction step, the closing letter is treated as a complete narrative that can be assessed directly against the reference text.

In the direct comparison embodiment, the process begins in the same way as the primary embodiment, where the input JSON is passed through LLM1 to generate a closing letter, and LLM2 produces a reference text by summarizing the topics extracted from the input data. Further, instead of using topic modeling to extract specific candidate topics from the closing letter, the system immediately applies performance metrics to compare the closing letter (LLM1 output) with the reference text (LLM2 output) in their entirety. These performance metrics include cosine similarity, precision and recall, and F1 score.

The framework illustrated in FIG. 1 can be adapted to various alternate embodiments to enhance its flexibility, applicability, and robustness across different use cases and industries. Some of these embodiments are discussed as follows. Multiple validation LLMs, instead of relying on a single validation LLM (LLM2), the framework can incorporate multiple LLMs trained on different domains. This allows for the generation of domain-specific reference texts, enhancing the accuracy and relevance of the validation process across diverse industries such as healthcare, finance, legal services, and more.

In an embodiment, the topic modeling module can be configured to dynamically adjust the number of topics based on the length or complexity of the input data. For instance, longer and more complex documents may require a higher number of topics to capture all relevant themes, while shorter documents may necessitate fewer topics for efficiency.

The framework can include feedback mechanisms where performance metrics inform the training and fine-tuning of both the LLM1 and the LLM2. This iterative process ensures continuous improvement in the quality of generated outputs and the accuracy of validation. Additional or alternative performance metrics tailored to specific domains can be integrated. For example, in legal applications as discussed above, metrics might include the accuracy of legal terminology, while in customer service, metrics could focus on sentiment accuracy and resolution effectiveness.

The framework can generate a confidence score based on the performance metrics, indicating the likelihood that the LLM-generated output meets predefined quality standards. High confidence scores may indicate reliable outputs, whereas low scores could trigger manual reviews or further automated refinement.

According to an exemplary embodiment, a large corporation employs a complaint management system to handle customer grievances related to its products and services. The system logs each complaint as a JSON object containing details such as customer information, product details, nature of the complaint, and actions taken to resolve the issue.

In step A, a new complaint record is entered into the system and stored as a JSON object. The LLM1 receives this JSON object and generates a closing letter summarizing the complaint and the resolution provided to the customer.

In step B, the input JSON undergoes topic modeling to extract key topics such as "product defect," "customer satisfaction," "quality assurance," and "resolution steps." These topics are passed to the LLM2, which generates a reference text that encapsulates these key themes in a human-readable format.

The closing letter produced by LLM1 is similarly analyzed through topic modeling to extract candidate topics. The system compares the reference text and the candidate text using performance metrics including, but not limited to cosine similarity, precision, recall, and F1 score. The cosine similarity ensures the overall textual similarity between the reference and the closing letter. The precision, recall, and F1 score assess the accuracy and completeness of the topics covered in the closing letter relative to the reference.

The disclosed framework also generates a validation score based on the performance metrics, indicating the quality of the closing letter. If the validation score meets the predefined threshold, the closing letter is deemed accurate and is automatically sent to the customer. If the score is below the threshold, the system flags the closing letter for manual review and possible revision.

The automated validation process allows the system to handle a large volume of complaints efficiently. Objective performance metrics ensure that all closing letters meet a consistent quality standard. Reduces the need for extensive human oversight, freeing up resources for more complex tasks. Ensures that customers receive accurate and coherent summaries of their complaints and resolutions.

The framework provides a specific technical solution to the problem of validating LLM-generated outputs without human reference data. By integrating topic modeling, LLMs, and performance metrics, the disclosure enhances the reliability and efficiency of text generation tasks, which constitutes a tangible technological improvement over existing methods.

The use case in a complaint management system demonstrates a practical application of the framework, showcasing how it can be deployed in real-world scenarios to generate and validate the closing letters automatically. Additionally, the combination of topic modeling algorithms with multiple LLMs and quantitative performance metrics represents an innovative integration of established technologies. This synergy results in a more efficient and reliable validation process, addressing the complexities of generative AI in a novel manner.

The framework's ability to automate the validation process and its scalability highlight its utility in handling large datasets and diverse applications without the need for extensive human intervention. This automation underscores the disclosure's role in advancing the field of AI-driven text generation and validation.

By employing objective performance metrics such as cosine similarity, precision, recall, and F1 score, the framework ensures an unbiased evaluation of LLM outputs. This is crucial in establishing the framework as a concrete, technical process rather than an abstract idea.

The framework addresses the limitations of subjective human evaluations and resource-intensive validation methods by providing an automated, scalable solution. This reduction in reliance on human judgment enhances the technical robustness and practical applicability of the disclosure.

To assess the performance of different Large Language Models (LLMs) in generating accurate and contextually relevant closing letters for a given TWD record, the proposed unsupervised validation framework is implemented with the goal to compare and evaluate the accuracy, coherence, and relevance of the generated outputs using a set of performance metrics. These results will be used to identify the most suitable LLM for the TWD summarization and closing letter generation app.

The framework was applied to three distinct models: LLM-a, LLM-b, and LLM-c. The performance of each model was measured using key evaluation metrics, including cosine similarity, precision, recall, and F1 Score.

Cosine similarity measures the textual similarity between the closing letter generated by the LLM and the reference text produced by LLM2. Cosine similarity matric calculates the cosine of the angle between the vector representations of the two texts, with a value closer to 1 indicating a higher similarity. Further, precision matric evaluates the proportion of relevant topics identified in the generated closing letter relative to the total topics extracted. Higher precision means that the LLM effectively includes relevant topics in its output without introducing unnecessary or unrelated information.

The recall matric assesses the proportion of relevant topics from the reference text that are successfully captured in the generated closing letter. A higher recall score indicates that the LLM includes most of the key topics in its summary. The F1 score is the harmonic mean of precision and recall, offering a balanced measure of the LLM's accuracy and completeness. A higher F1 score indicates better overall performance in generating a coherent and comprehensive closing letter.

The results of the evaluation are summarized in table 1 below:

TABLE 1

| Model | Cos similarity | Precision | Recall | F1 |
|-------|----------------|-----------|--------|------|
| LLM-a | 0.39 | 0.51 | 0.49 | 0.50 |
| LLM-b | 0.77 | 0.67 | 0.58 | 0.62 |
| LLM-c | 0.87 | 0.71 | 0.70 | 0.70 |

LLM-a scored the lowest across all metrics, with a Cosine Similarity of 0.39, Precision of 0.51, and an F1 Score of 0.50. These scores suggest that while LLM-a was able to identify some relevant topics, its output lacked accuracy and comprehensiveness. The model struggled to align its output with the reference text and omitted several key topics, leading to a low recall score (0.49). This makes LLM-a unsuitable for generating high-quality closing letters in the TWD summarization context.

LLM-b demonstrated significant improvements over LLM-a, with a Cosine Similarity of 0.77, indicating a stronger alignment between the generated closing letter and the reference text. LLM-b also showed better performance in terms of Precision (0.67) and F1 Score (0.62), although its Recall (0.58) suggests that some important topics were still missed in the output. While LLM-b is more effective at generating coherent summaries, there is still room for improvement in ensuring that all key topics are captured.

LLM-c outperformed both LLM-a and LLM-b across all metrics, achieving a Cosine Similarity of 0.87, Precision of 0.71, and a Recall of 0.70, resulting in an F1 Score of 0.70. These scores indicate that LLM-c consistently generated closing letters that were highly similar to the reference text, accurately captured the relevant topics, and provided a balanced and comprehensive summary. The high performance across all metrics makes LLM-c the most suitable model for generating closing letters in the TWD summarization and closing letter generation app.

FIG. 2 illustrates a graph representing the relationship between the coherence score and the number of topics identified from a given JSON object using a topic modeling algorithm, according to an embodiment of the disclosure. The figure provides critical insight into how the system determines the optimal number of topics for generating an accurate and coherent summary of the input data.

The coherence score is a metric used to measure how interpretable and semantically meaningful the extracted topics are. It helps evaluate the quality of the topics generated by the topic modeling process. A higher coherence score indicates that the words within each topic are strongly related and form a more meaningful cluster, while a lower coherence score suggests that the topics are less interpretable or relevant.

In the context of LLM-generated outputs and validation, the coherence score serves as a key determinant for selecting the most appropriate number of topics to summarize the input data. The goal is to achieve a balance where the topics provide a comprehensive representation of the data without being overly fragmented or too broad.

The x-axis of the graph in FIG. 2 represents the number of topics extracted from the input data, ranging from 1.0 to 5.0 topics. These are potential configurations of the topic model, where the system tests different numbers of topics to evaluate which configuration offers the best representation of the input data.

The y-axis represents the coherence score, a numerical value that indicates the quality of the topics extracted. In FIG. 2, the coherence score ranges from 0.385 to 0.405.

The curve on the graph shows how the coherence score changes as the number of topics varies. The optimal number of topics corresponds to the point where the coherence score reaches its maximum value.

As shown in FIG. 2, the coherence score peaks at four topics, with a maximum coherence score of 0.407. This indicates that, for the given JSON object, the most semantically meaningful representation of the data is achieved when the topic model extracts four distinct topics.

At four topics, the system achieves the best balance between detail and coherence. The topics are specific enough to capture the key themes of the data, but not so fragmented that the coherence score diminishes. If fewer than four topics are extracted (e.g., 2 or 3), the coherence score is lower, indicating that the topic model may be oversimplifying the data, failing to capture all the important themes.

Similarly, extracting more than four topics (e.g., 5 or more) results in a slight drop in the coherence score, suggesting that the model is starting to over-divide the data, leading to fragmented or less meaningful topics. Thus, four topics are considered the optimal number for this specific input dataset.

In the context of validating LLM-generated outputs, such as a closing letter, the optimal number of topics identified using the coherence score (in this case, four) is critical for ensuring that the generated summary or closing letter aligns closely with the key themes in the input data. Once the optimal number of topics is determined, these topics can be used to generate a reference text via LLM2 and validate the closing letter produced by LLM1.

The process of optimizing the number of topics ensures that the system provides a meaningful, coherent, and relevant validation standard, avoiding oversimplification or over-fragmentation of the input data.

FIG. 3 illustrates the step-by-step method for validating the output of a Large Language Model (LLM) using an unsupervised validation framework. The method outlines the following steps in the validation process, input data is processed, topics are extracted, and performance metrics are used to determine the quality of the generated output. The method ensures that the LLM output, such as a closing letter, is coherent, contextually accurate, and aligned with the key themes of the input data.

The first step involves receiving input data by the generative AI system, step 302. This input data could be in various formats, including structured data like JSON objects or unstructured data such as customer feedback logs, complaint records, or technical reports. The input data contains essential information that will be processed by the LLM to generate a human-readable output.

In an embodiment, the input data can be received from multiple sources, including customer relationship management (CRM) systems, support ticketing systems, or enterprise document repositories. The flexibility to handle both structured and unstructured data ensures the system can be applied across various industries. For instance, for a complaint management system, the input data could be a customer complaint log, including details such as the product name, the nature of the issue, and the actions taken. This data will later be summarized into a closing letter by the LLM.

Once the input data is received, the LLM processes it and generates an LLM output, typically in the form of a closing letter or a summary document, in step 304. The output is expected to encapsulate the main ideas and important details of the input data, presented in a human-readable format.

In an embodiment, LLM1 is trained on large datasets, including text from similar domains, allowing it to generate contextually relevant, grammatically accurate text. The model adapts its output based on the input data type, ensuring that the generated text reflects the key themes appropriately. In the context of customer service, the LLM might generate a closing letter that acknowledges the customer's complaint and summarizes the resolution: "Thank you for bringing the issue regarding your product to our attention. We have resolved the matter by issuing a replacement and ensuring future quality control measures are in place."

The system proceeds by extracting a first set of topics from the input data, in step 306. This involves performing topic modeling on the input, where key concepts and ideas are distilled into a set of keywords representing the core themes.

In an embodiment, topic modeling techniques like Latent Dirichlet Allocation (LDA) or Non-negative Matrix Factorization (NMF) can be employed to extract topics. The algorithm identifies patterns in the word distribution of the input data, helping to isolate the main topics. The number of topics extracted is optimized based on the coherence score, which ensures that the topics are both relevant and interpretable. For a product recall log, the first set of topics could include keywords such as "defect," "safety," "product replacement,' and "customer satisfaction."

Further, the method comprises converting topics into human-readable reference data, step 308. Once the first set of topics is extracted, the system converts these topics into human-readable text to generate a reference data. This is where LLM2 transforms the extracted keywords into a coherent narrative that summarizes the key topics from the input data.

In an embodiment, LLM2, also referred to as the Validation LLM, is specifically trained to take extracted topics and produce fluent, human-readable summaries. These summaries serve as reference texts that will later be used to validate the output of LLM1. For instance, in a legal document analysis system, if the input data includes multiple clauses about intellectual property rights, LLM2 could generate a summary such as: "The contractual clauses emphasize the protection of intellectual property rights and outline the processes for dispute resolution."

Furthermore, the method comprises extracting second set of topics from LLM Output, step 310. Simultaneously, the system extracts a second set of topics from the LLM1 output. This step mirrors the topic extraction performed on the input data but is applied to the closing letter generated by LLM1. The aim is to identify the key themes and concepts in the LLM-generated output.

In an embodiment, similar topic modeling techniques (LDA or NMF) are used to extract topics from the LLM output. The goal is to ensure that the main ideas present in the generated text align with those extracted from the input data. For instance, if the generated closing letter addresses a product defect, the second set of topics might include keywords like "product issue," "resolution," and "quality assurance."

The method further comprises converting second set of topics into human-readable candidate data, step 312. The second set of topics extracted from the LLM output is then converted into human-readable text, resulting in a candidate data that summarizes the key points of the LLM-generated output. This candidate text represents the key themes from the closing letter or summary document.

In an embodiment, the system uses LLM2 to convert the extracted topics from the LLM output into coherent text. The candidate data should be a faithful representation of the topics identified in the LLM-generated output.

For a customer service system, the candidate data might summarize the closing letter as: "The customer service team acknowledged the product defect and offered a resolution in the form of a replacement."

In step 314, the reference data is compared with the candidate data. Specifically, the system compares the reference data (summarized topics from the input data) with the candidate data (summarized topics from the LLM output) using one or more performance metrics. These metrics include cosine similarity, precision, recall, and F1 score, which provide a quantitative assessment of how well the LLM output matches the key themes of the input data.

In an embodiment, the comparison process involves calculating the cosine similarity to measure the textual similarity between the reference and candidate texts, while precision evaluates how accurately the topics from the input data are reflected in the LLM output. Recall measures how many relevant topics from the input are captured in the LLM output, and the F1 score provides a balanced metric of both precision and recall. In the context of technical documentation, if the LLM output misses key topics identified in the reference text (e.g., safety protocols), the precision and recall scores will reflect this, ensuring that any missing information is flagged for further review.

Finally, the method comprises determining validation score, in step 316. The system determines a validation score based on the comparison of the reference and candidate data. This score indicates the overall accuracy and relevance of the LLM-generated output, helping to validate whether the closing letter or summary document is acceptable or requires revision.

In an embodiment, the validation score is a weighted combination of the performance metrics, providing a comprehensive assessment of how well the LLM output aligns with the input data. A high validation score suggests that the LLM output is coherent, contextually accurate, and aligned with the original topics. In a quality assurance system, the validation score helps determine whether the generated report on product defects meets the required standards before it is sent to stakeholders. A high score would indicate that the report accurately reflects the input data, ensuring no critical details are omitted.

Figure 4:
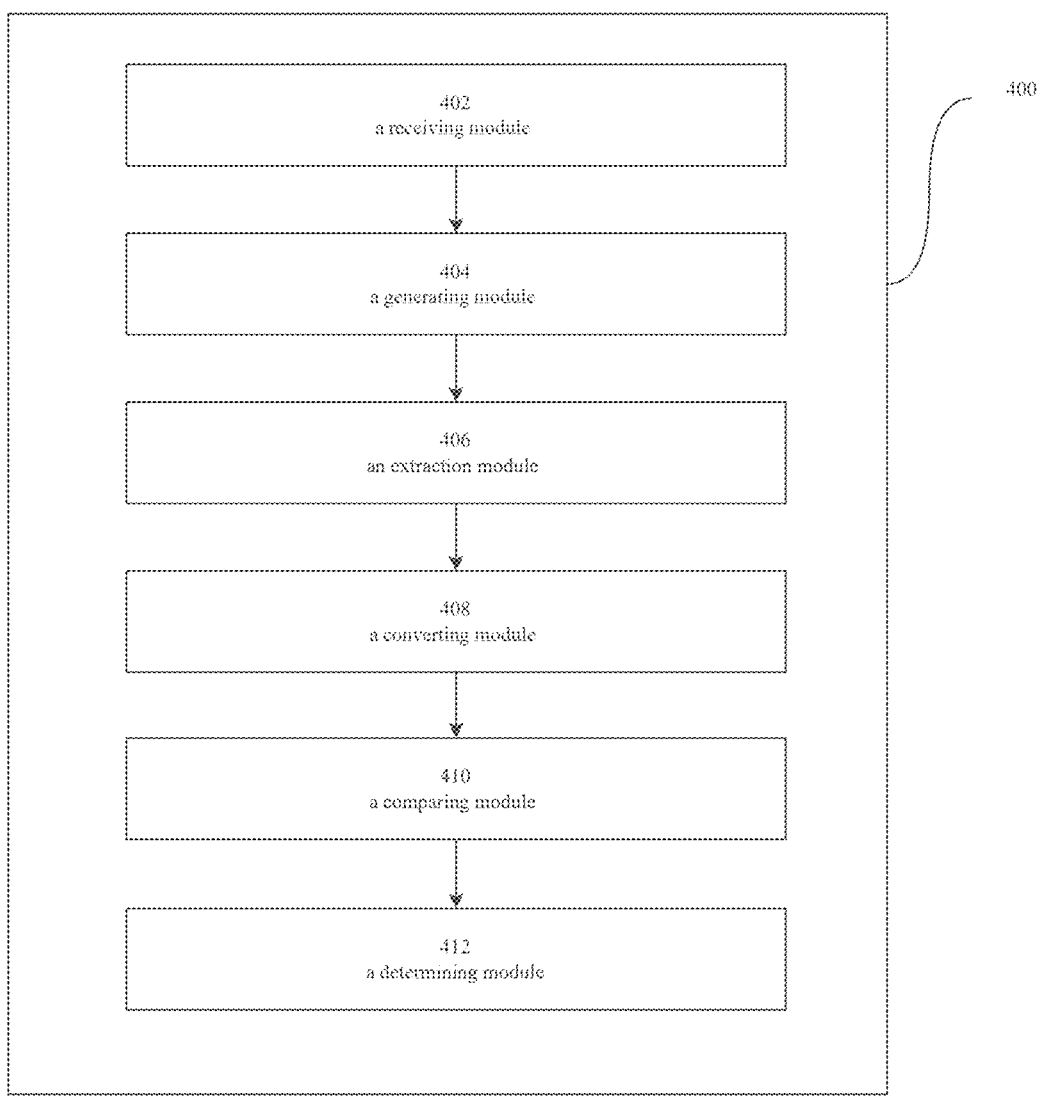
FIG. 4 illustrates an overall architectural framework of a Generative AI system designed to perform unsupervised validation of outputs generated by an LLM according to an embodiment of this disclosure.

FIG. 4 illustrates an overall architectural framework of a Generative AI system designed to perform unsupervised validation of outputs generated by a Large Language Model (LLM). This system ensures that the output generated by the LLM, such as summaries, letters, or reports, is validated against the input data using performance metrics to assess its quality and relevance. The system comprises several key components that work together to extract key topics from both the input data and the LLM output, generate human-readable reference data, and validate the output based on comparison with the reference data.

The system comprising a receiving module 402, a generating module 404, an extraction module 406, a converting module 408, a comparing module 410, and a determining module 412. The receiving module 402 is responsible for receiving the input data, which can take the form of structured or unstructured text. This input data can include a wide range of textual formats such as structured data and unstructured data. The structure data includes customer complaints, product feedback, and CRM entries. The unstructured data includes emails, legal documents, technical reports, or chat transcripts.

In an embodiment, the input data is pre-processed to remove any noise (e.g., punctuation, stop words) and is tokenized before being processed by the subsequent modules. The system can also apply pre-defined filters to the input data to focus on specific sections, such as the issue description in a complaint or key clauses in a legal document.

In a customer service system, the input data could be a customer's complaint about a defective product. This complaint would be received in a structured format, such as a JSON object, detailing the nature of the issue and the actions taken to resolve it.

The generating module 404 takes the received input data and processes it to generate the LLM output. This output is typically a summary, a closing letter, or a report that distills the key information from the input data into a human-readable format.

The generating module 404 comprises a Large Language Model (LLM) trained on vast datasets related to the domain of application. Depending on the input data, the LLM can be fine-tuned for specific tasks, such as generating customer service letters, technical reports, or legal summaries.

For instance, if the input data is a customer's complaint, the LLM could generate a closing letter summarizing the issue and providing the company's resolution. The letter could say something like: "We apologize for the inconvenience caused by the defective product and have initiated a replacement. Thank you for your patience as we work to resolve this issue."

The extraction module 406 is responsible for extracting topics from both the input data and the LLM-generated output. It performs two main tasks extracting the first set of topics from input data and extracting the second set of topics from LLM output. While extracting the first set of topics from input data, the module applies topic modeling algorithms to identify the key concepts from the input data. Each identified topic is represented by a set of keywords.

For extracting the second set of topics from LLM output, after the LLM generates the output, the extraction module 406 also extracts the key topics from this output to allow for a comparative analysis with the input data.

In an embodiment, the extraction process can leverage various topic modeling algorithms such as Latent Dirichlet Allocation (LDA), Non-negative Matrix Factorization (NMF), or Latent Semantic Analysis (LSA). These algorithms work by analyzing the word co-occurrence patterns within the text, allowing the system to distill large amounts of unstructured data into manageable topics.

In a legal document analysis system, the extraction module 406 could identify key topics such as "intellectual property," "contract breach," and "dispute resolution" from a contract. Similarly, it would extract corresponding topics from the LLM-generated legal summary.

The converting module 408 transforms the extracted topics into human-readable data. It converts the first set of topics (from the input data) into a reference text and converts the second set of topics (from the LLM output) into a candidate text. The converting module 408 transforms the first set of topics into reference data, a concise summary representing the key topics from the input data. Generating Candidate Data: Similarly, it transforms the second set of topics into candidate data, representing the core ideas captured in the LLM output.

In an embodiment, the converting module 408 leverages LLM2, a separate language model specifically designed to generate fluent, human-readable text based on the extracted topics. This ensures that the reference and candidate data can be easily compared, both in terms of content and linguistic structure.

For a customer feedback system, the converting module 408 might generate a human-readable summary of a customer's complaint: "The customer reported dissatisfaction with the product due to poor quality and requested a replacement. The company has resolved the issue by issuing a new product."

The comparing module 410 is tasked with comparing the reference data (generated from the input topics) and the candidate data (generated from the LLM output topics) using one or more performance metrics. In an embodiment, the performance metrics include cosine similarity, precision, recall, and F1 score. Cosine similarity measures the similarity between the reference and candidate data based on their vector representations.

Precision assesses the proportion of correctly identified topics in the candidate data relative to the total topics present in the LLM output. Recall evaluates how well the relevant topics from the reference data are captured in the LLM output. F1 Score provides a balanced measure of both precision and recall, ensuring that the LLM-generated output accurately reflects the key points from the input data.

In an embodiment, the comparing module 410 can be further enhanced by incorporating additional metrics like BLEU score or ROUGE score, commonly used in natural language generation tasks, for more granular analysis of text similarity.

In a technical reporting system, the comparing module 410 could assess how well the generated report reflects key safety concerns or procedural details present in the original technical data.

The determining module 412 is responsible for calculating a validation score based on the comparison results. This score reflects the accuracy, coherence, and relevance of the LLM output. The system computes a score that indicates how closely the LLM output aligns with the key topics of the input data. A high validation score suggests that the output is accurate and reliable.

In some embodiments, the determining module 412 also generates a confidence score that reflects the probability of the LLM output meeting a predefined quality standard. This confidence score can help decision-makers determine whether the LLM output is ready for use or requires further review.

In one embodiment, the system can be configured to automatically select the best LLM from a pool of available models based on the validation score. This selection process allows the system to adapt and improve over time by identifying the most effective LLM for specific tasks. In a business reporting system, the determining module 412 could evaluate the validation score of multiple LLM-generated reports to determine which model consistently produces the most accurate summaries of financial data.

In an embodiment, the system is configured to compute a coherence score to determine the optimal number of topics for both the input data and the LLM output. This ensures that the topics extracted are neither too broad nor too fragmented.

In certain embodiments, the system can be customized for domain-specific applications, such as medical records or legal document summaries, by training the LLM models and topic extraction algorithms on domain-specific datasets.

In an embodiment, the system can compare the performance of multiple LLMs by applying the validation framework to outputs from different models. The LLM with the highest validation score can be selected for future output generation.

The disclosed unsupervised validation framework for LLM outputs offers several significant advantages, particularly in enhancing the accuracy, efficiency, and scalability of LLM-generated content. One of the primary advantages of the system is its ability to automate the validation process without relying on human-generated reference data. Traditional methods for evaluating LLM outputs often involve manual assessments, which can be time-consuming, subjective, and resource-intensive. The proposed system addresses these limitations by employing topic modeling and performance metrics to objectively validate LLM outputs, thus reducing the need for human intervention and ensuring consistency across large-scale operations.

Another key advantage is the system's ability to handle both structured and unstructured data, making it highly versatile and applicable across multiple industries, including customer service, legal analysis, and technical documentation. By receiving a wide variety of input formats, the system can be easily integrated into existing workflows in diverse domains. The use of topic modeling algorithms such as Latent Dirichlet Allocation (LDA), Non-negative Matrix Factorization (NMF), and Latent Semantic Analysis (LSA) ensures that the most relevant themes are extracted from the input data, which are then used to generate coherent and contextually accurate LLM outputs. This flexibility allows the system to adapt to different types of data and output requirements, improving its usability across a wide range of applications.

The framework also improves the quality assurance process for LLM outputs by utilizing a set of performance metrics, including cosine similarity, precision, recall, and F1 score. These metrics enable the system to provide a quantitative assessment of how well the LLM-generated content aligns with the original input data. The inclusion of a validation score and a confidence score further enhances decision-making processes by offering a clear indicator of the output's reliability and quality. This feature is particularly beneficial in high-stakes industries, such as healthcare or legal, where the accuracy and relevance of generated content are critical.

Additionally, the system offers scalability and efficiency by automating the comparison between reference and candidate data. The ability to validate LLM outputs across a large dataset quickly and effectively is crucial in environments where thousands of outputs need to be assessed, such as customer service centers or large document review processes. By streamlining the validation process, the system reduces manual workload and improves overall productivity, allowing organizations to handle a higher volume of content without compromising quality.

The disclosed system not only ensures that LLM-generated outputs are accurate and contextually relevant but also provides a scalable, efficient, and automated approach to validation. This makes it an invaluable tool for industries looking to leverage the power of LLMs while maintaining strict quality control and reducing the need for manual validation efforts.

Figure 5:
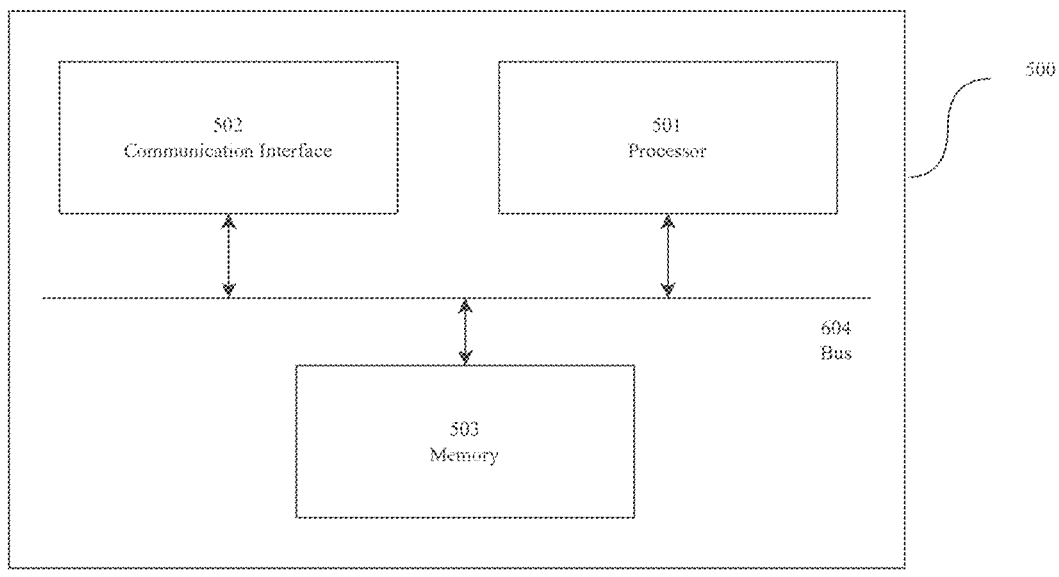
FIG. 5 illustrates a schematic diagram of a communication apparatus according to an embodiment of the disclosure.

FIG. 5 illustrates a schematic diagram of another communication apparatus 500 according to an embodiment of the disclosure. The communication apparatus 500 includes a processor 501, a communication interface 502, and a memory 503. The processor 501, the communication interface 502, and the memory 503 may be connected to each other via a bus 504. The bus 504 may be a peripheral component interconnect (peripheral component interconnect, PCI) bus, an extended industry standard architecture (extended industry standard architecture, EISA) bus, or the like. The bus 504 may be classified into an address bus, a data bus, a control bus, and the like. For ease of representation, the bus is represented by using only one line in FIG. 4, but it does not indicate that there is only one bus or one type of bus. The processor 501 may be a central processing unit (central processing unit, CPU), a network processor (network processor, NP), or a combination of a CPU and an NP. The processor may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), generic array logic (Generic Array Logic, GAL), or any combination thereof. The memory 503 may be a volatile memory or a non-volatile memory or may include a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random-access memory (random access memory, RAM), and is used as an external cache.

The connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or products. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control products. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, products, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method for unsupervised validation of a Large Language Model (LLM) generated output, comprising the steps of:

receiving, by a generative Artificial Intelligence (AI) system, input data representing a set of information to be processed by a primary Large Language Model (LLM1);

generating LLM output by the LLM1 based on the input data;

extracting a first set of topics from the input data, wherein each topic in the first set of topics is represented by a set of keywords;

converting the first set of topics into human-readable data by a second Large Language Model (LLM2) to generate reference data representing key topics from the first set of topics of the input data;

extracting a second set of topics from the generated LLM output;

converting the second set of topics into human-readable data by the LLM2 to generate candidate data representing key topics from the second set of topics of the generated LLM output;

comparing the reference data with the candidate data using one or more performance metrics;

determining a validation score based on the comparison of the reference data and the candidate data; and automatically performing a control action comprising:

releasing the generated LLM output when the validation score meets or exceeds a predefined threshold, and routing the generated LLM output for manual review when the validation score is below the predefined threshold.

2. The method as claimed in claim 1, wherein the one or more performance metrics comprise at least one of cosine similarity metric, precision metric, recall metric, and F1 score metric.

3. The method as claimed in claim 1, wherein the extracting step applies a topic modeling algorithm selected from the group consisting of Latent Dirichlet Allocation (LDA) algorithm, Non-negative Matrix Factorization (NMF) algorithm, and Latent Semantic Analysis (LSA) algorithm.

4. The method as claimed in claim 1, wherein extracting the first set of topics comprises determining an optimal number of the first set of topics based on computation of a coherence score.

5. The method as claimed in claim 1, further comprising selecting an LLM from a plurality of LLMs for output generation based on the validation score.

6. The method as claimed in claim 1, further comprising generating a confidence score based on the validation score, wherein the confidence score reflects probability of the LLM-generated output meeting a predefined quality standard.

7. The method as claimed in claim 1, wherein the input data comprises structured or unstructured text data, and the generated LLM output comprises a summary, a letter, or a report derived from the input data.

8. A generative Artificial Intelligence (AI) system for unsupervised validation of a large language model (LLM) generated output, the system comprising:

a memory for storing input data representing a set of information to be processed by the LLM;

a processor configured to:

receive input data by a primary Large Language Model (LLM1);

generate LLM output by the LLM1 based on the input data;

extract, by an extraction module, a first set of topics from the input data, wherein each topic in the first set of topics is represented by a set of keywords;

convert the first set of topics into human-readable data by a second Large Language Model (LLM2) to generate reference data representing key topics from the first set of topics of the input data;

extract, by the extraction module, a second set of topics from the generated LLM output;

convert the second set of topics into human-readable data by the LLM2 to generate candidate data representing key topics from the second set of topics of the generated LLM output;

compare the reference data with the candidate data using one or more performance metrics;

determine a validation score based on the comparison of the reference data and the candidate data; and automatically perform a control action comprising:

releasing the generated LLM output when the validation score meets or exceeds a predefined threshold, and routing the generated LLM output for manual review when the validation score is below the predefined threshold.

9. The system as claimed in claim 8, wherein the one or more performance metrics comprise at least one of cosine similarity metric, precision metric, recall metric, and F1 score metric.

10. The system as claimed in claim 8, wherein the system is configured to apply a topic modeling algorithm selected from the group consisting of Latent Dirichlet Allocation (LDA) algorithm, Non-negative Matrix Factorization (NMF) algorithm, and Latent Semantic Analysis (LSA) algorithm.

11. The system as claimed in claim 8, wherein the system is further configured to determine an optimal number of the first set of topics based on computation of a coherence score.

12. The system as claimed in claim 8, wherein the system is further configured to select an LLM from a plurality of LLMs for output generation based on the validation score.

13. The system as claimed in claim 8, wherein the system is further configured to generate a confidence score based on the validation score, wherein the confidence score reflects probability of the LLM-generated output meeting a predefined quality standard.

14. The system as claimed in claim 8, wherein the input data comprises structured or unstructured text data, and the generated LLM output comprises a summary, a letter, or a report derived from the input data.

15. A non-transitory computer-readable medium having stored thereon computer-readable instructions that, when executed by a processor, cause the processor to execute a method for unsupervised validation of a Large Language Model (LLM) generated output, comprising the steps of:

receiving, by a generative Artificial Intelligence (AI) system, input data representing a set of information to be processed by a primary Large Language Model (LLM1);

generating LLM output by the LLM1 based on the input data;

extracting a first set of topics from the input data, wherein each topic in the first set of topics is represented by a set of keywords;

converting the first set of topics into human-readable data by a second Large Language Model (LLM2) to generate reference data representing key topics from the first set of topics of the input data;

extracting a second set of topics from the generated LLM output;

converting the second set of topics into human-readable data by the LLM2 to generate candidate data representing key topics from the second set of topics of the generated LLM output;

comparing the reference data with the candidate data using one or more performance metrics;

determining a validation score based on the comparison of the reference data and the candidate data; and automatically performing a control action comprising:

releasing the generated LLM output when the validation score meets or exceeds a predefined threshold, and routing the generated LLM output for manual review when the validation score is below the predefined threshold.

16. The non-transitory computer-readable medium as claimed in claim 15, wherein the one or more performance metrics comprise at least one of cosine similarity metric, precision metric, recall metric, and F1 score metric.

17. The non-transitory computer-readable medium as claimed in claim 15, wherein the extracting step applies a topic modeling algorithm selected from the group consisting of Latent Dirichlet Allocation (LDA) algorithm, Non-negative Matrix Factorization (NMF) algorithm, and Latent Semantic Analysis (LSA) algorithm.

18. The non-transitory computer-readable medium as claimed in claim 15, wherein extracting the first set of topics comprises determining an optimal number of the first set of topics based on computation of a coherence score.

19. The non-transitory computer-readable medium as claimed in claim 15, further comprising selecting an LLM from a plurality of LLMs for output generation based on the validation score.

20. The non-transitory computer-readable medium as claimed in claim 15, further comprising generating a confidence score based on the validation score, wherein the confidence score reflects probability of the LLM-generated output meeting a predefined quality standard.

* * * * *